T. H. ELLIS.
COTTON CHOPPER.
APPLICATION FILED OCT. 24, 1908.
913,115.
Patented Feb. 23, 1909.
2 SHEETS—SHEET 1.
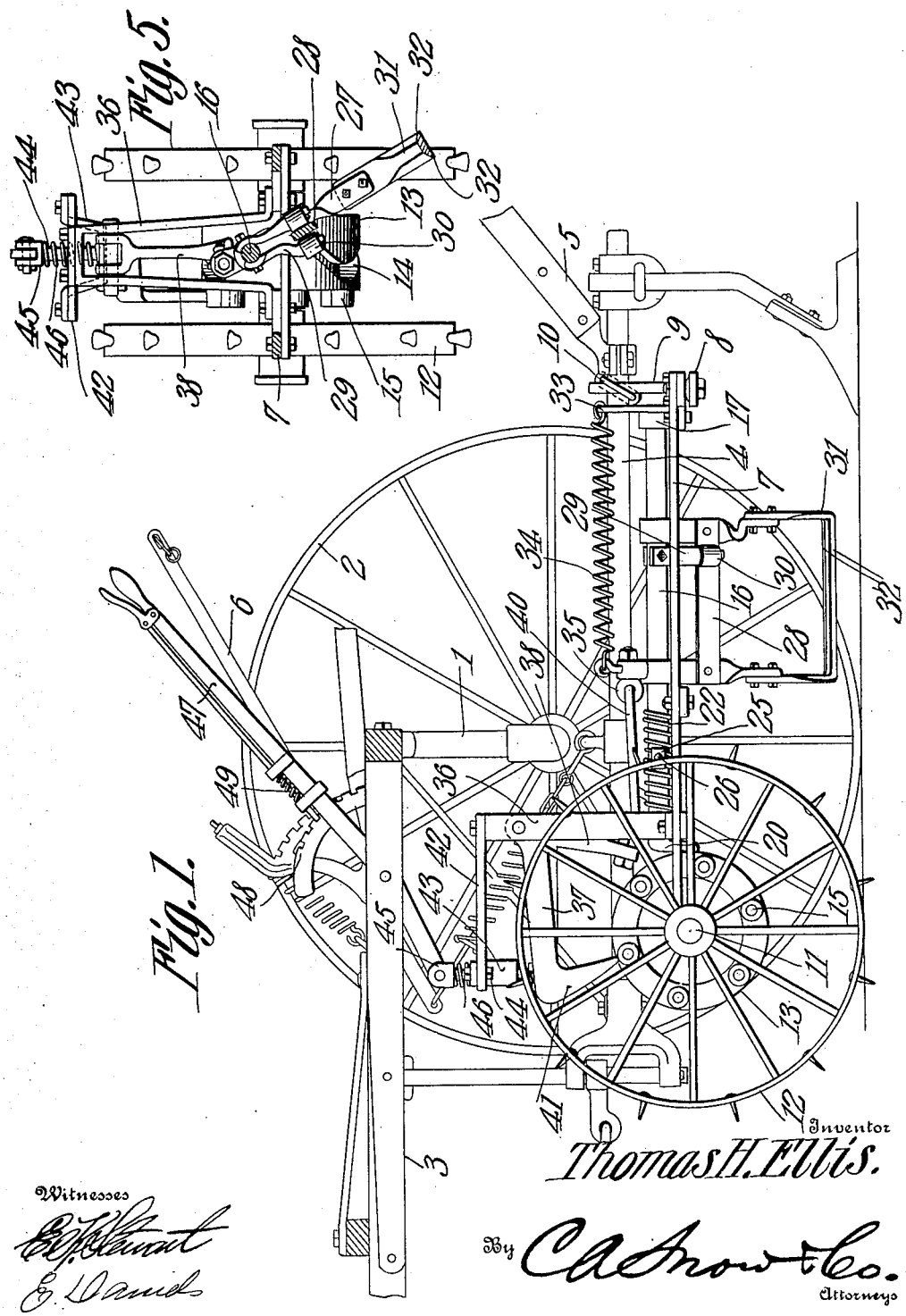
Witnesses
Inventor
Thomas H. Ellis.
By C. A. Snow & Co.
Attorneys

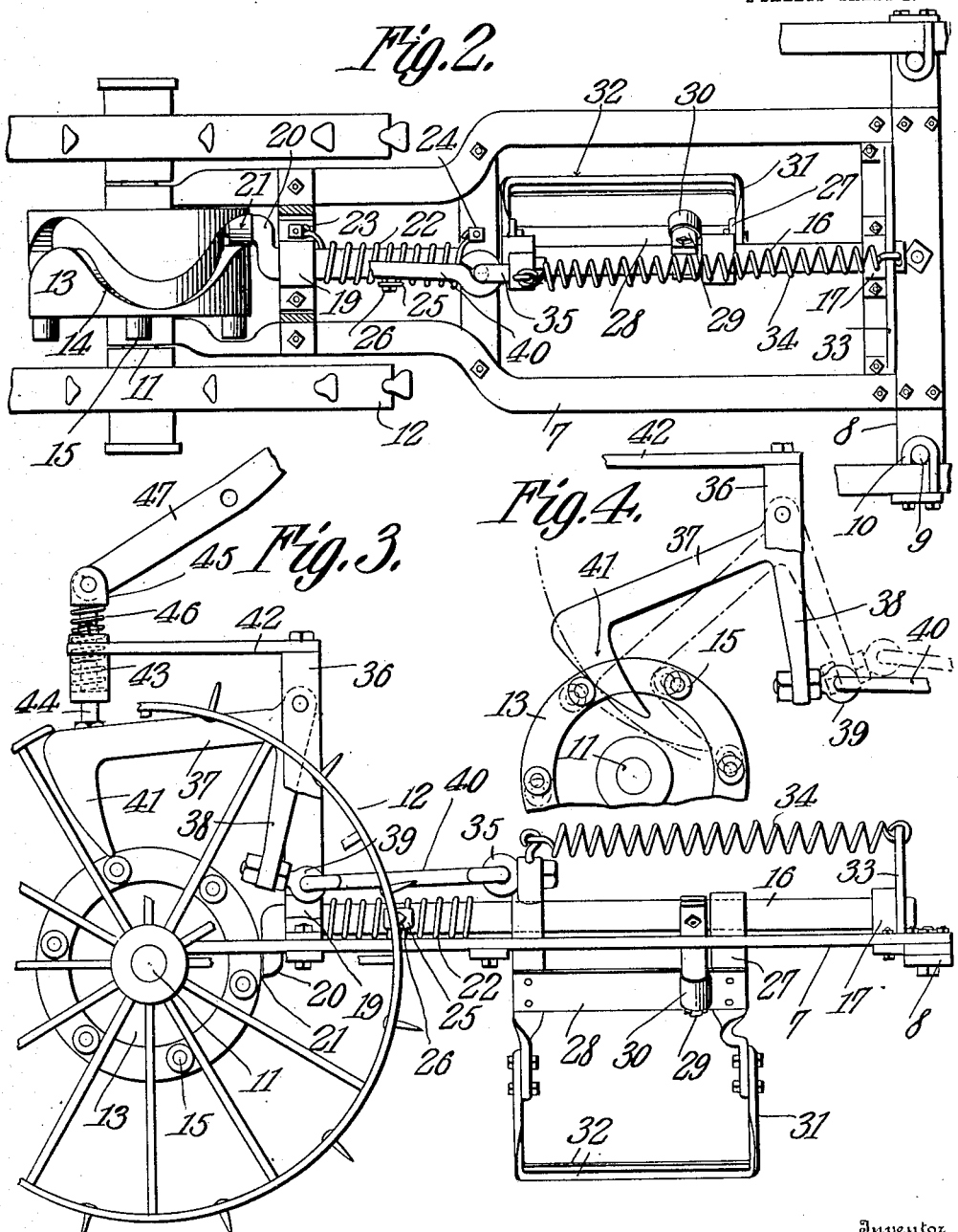

UNITED STATES PATENT OFFICE.

THOMAS HENRY ELLIS, OF AUSTIN, TEXAS, ASSIGNOR OF ONE-HALF TO BEN T. CARY, OF AUSTIN, TEXAS.

COTTON-CHOPPER.

No. 913,115.      Specification of Letters Patent.      Patented Feb. 23, 1909.

Application filed October 24, 1908. Serial No. 459,362.

*To all whom it may concern:*

Be it known that I, THOMAS H. ELLIS, a citizen of the United States, residing at Austin, in the county of Travis and State of Texas, have invented a new and useful Cotton-Chopper, of which the following is a specification.

This invention has relation to cotton choppers, and it consists in the novel construction and arrangement of its parts, as hereinafter shown and described.

The object of the invention is to provide an implement of the character indicated in which the chopping hoe or blade is so mounted and actuated as to move transversely across a standing row of plants as the implement passes along the same, at approximately a right angle to the said row during the chopping or cutting operation.

A further object of the invention is to provide a cotton chopper in the form of an attachment which may be easily and quickly applied to the frame of a cultivator, and thus effect a combined implement whereby the crop may be cultivated at the same time that it is thinned or chopped out. By providing an implement as stated wherein the chopper operates at a right angle to the line or row of standing plants during the chopping operation the plants are cut out in blocks and the soil around those plants left standing remains undisturbed. During the chopping operation the hoe or blade operates upon the standing plants during its movement from right to left and from left to right, and, while it is cutting out the superfluous plants, the said blade or hoe does not move forward with the body of the attachment or the cultivator to which it is applied, but remains substantially at a fixed position with relation to the line of movement of the implement, and after the hoe has accomplished a cutting stroke, it moves in a forward direction at a greater rate of speed than the implement moves in its line of travel, and, consequently, makes up for the movement that it loses while performing the cutting operation. The hoe or blade is so constructed as to readily free itself of trash or vegetable growth, and, by operating upon the standing plants, as indicated, the soil is evenly divided or distributed at the opposite sides of the row, which leaves the crop in favorable condition to be worked or cultivated and reduces the tendency of side draft of the implement to a minimum.

In the accompanying drawings:—Figure 1 is a side elevation of the cotton chopper, showing the same applied to a cultivator, which is illustrated in section: Fig. 2 is a top plan view of the cotton chopper detached from the cultivator frame: Fig. 3 is a side elevation of the same: Fig. 4 is a side elevation of the mechanism of the cotton chopper for retarding the forward movement of the cutting blade during the cutting operation: Fig. 5 is a transverse sectional view of the chopper attachment.

The cultivator to which the cotton chopper is applied consists of the usual arch axle 1, which is supported by the ground wheels 2, and which is provided with a draft tongue 3. The beams 4 are pivotally connected with the frame of the cultivator in the usual manner and are provided with the handles 5, and the lever mechanisms 6 are fulcrumed upon the frame of the cultivator and are operatively connected with the said beams 4, and are adapted to raise and lower the same.

The chopper attachment consists of the frame 7, to the rear end of which is pivotally attached a bolster plate 8. The bolts 9 are pivotally mounted at the outer ends of the said plate 8 and are secured by means of U-shaped clamps 10 to the rear end portions of the cultivator beams 4. The axle 11 is journaled for rotation at the forward end portion of the frame 7, and the traction wheels 12 are fixed to the end portions of the said axle. The disk 13 is mounted upon the intermediate portion of the axle 11, and is provided upon its periphery with a continuous zig-zag groove 14. Friction rollers 15 are journaled for rotation upon one of the sides of the disk 13, and are located at regular intervals apart. The shaft 16 extends longitudinally of the frame 7 and is journaled at its rear end in a bearing 17 mounted upon the said frame, and at its forward end portion in a bearing 19, also mounted upon the said frame. The forward end of the shaft 16 terminates in the crank extremity 20, which is provided with a friction roller 21. The roller 21 is located in the zig-zag groove 14 of the disk 13 and is adapted to operate against the sides of the said groove. The coil spring 22 surrounds the forward portion of the shaft 16, and is attached at one end to the frame 7 at the point 23, and at its other end is fixed to the said frame at the point 24. The plate 25 is attached, by means of a screw 26, or its equivalent, to the shaft 16 and bears against the intermediate portion of the spring 22 and fixes the said intermediate portion with relaton to the said shaft. Thus the said spring 22 is virtually converted into a double spring, and when the shaft 16 rotates in one direction one end portion of the said spring 22 is wound up and the other end unwound, while the said end portions of the spring are operated upon reversely when the said shaft is swung in the opposite direction. The hoe-frame 27 is slidably mounted upon the shaft 16 and is provided with a flat bar 28, which is in parallel relation with the said shaft. The arms 29 are attached one to each side of the shaft 16 and extend down at their lower portions upon the opposite sides of the bar 28 and are provided with the friction rollers 30 which engage the opposite sides of the said bar. The U-shaped hoe or blade 31 is attached at its ends to the end portions of the frame 27 and the intermediate portion of the said hoe 31 is provided with cutting edges 32, which edges are located at the opposite sides of the said intermediate portion of the said hoe. The standard 33 is mounted upon the frame 7, and one end of the coil spring 34 is attached to the said standard, and the opposite end of the said spring 34 is connected with the hoe frame 27. The spring 34 is under tension with a tendency to draw the hoe-frame 27 and its attachments toward the standard 33. The eye-bolt 35 is pivotally mounted upon the hoe-frame 27. The arch 36 is mounted upon the forward end portion of the frame 7, and the escapement lever 37 is fulcrumed in the upper portion of the said arch. The said lever 37 is provided with a depending arm 38, to the lower end portion of which is pivotally attached an eye-bolt 39. The link 40 is pivotally connected at its forward end with the eye-bolt 39, and at its rear end with the eye-bolt 35.

The lever 37 is provided at its forward end with a downwardly projecting V-shaped portion 41, which is adapted to operate against the peripheries of the rollers 15 carried by the disk 13. The arms 42 are mounted upon the top of the arch 36 and are laterally and forwardly disposed with relation to the same. The yoke 43 connects the forward portions of the arms 42 together and lies transversely over the lever 37. The bolt 44 is slidably located in a perforation provided at the middle of the yoke 43, and is connected at its upper end with the bearing 45. The coil spring 46 surrounds the upper portion of the bolt 44 and is interposed between the upper surface of the yoke 43 and the lower end of the bearing 45. The working end of the lever 47 is pivotally connected with the bearing 45 and the said lever is fulcrumed upon the frame of the cultivator. The gear segment 48 is also mounted upon the frame of the cultivator, and is provided with peripheral teeth, which are adapted to be engaged by the spring-actuated pawl 49, carried by the said lever 47.

The operation of the cotton chopper is as follows:—As the cultivator is drawn along a row of standing plants, the plows carried by the beams 4 operate at the opposite sides of the row in the usual manner. As the traction wheels 12 rotate the axle 11 and the disk also rotate, and the zig-zag groove 14 in the periphery of the said disk which receives the roller 21 upon the crank portion 20 of the shaft 16 partially rotates the said shaft alternately in opposite directions, which movement of the shaft, by reason of the depending arms 29 and rollers 30, imparts to the hoe frame 27 and its attachments, a pendulous movement. Thus, as the cultivator proceeds along the row of plants, the hoe-blade 31 is reciprocated transversely across the row, and at each reciprocation the intermediate portion of the said blade crops out a block of the standing plants from the row. By reason of the fact that the blade 31 is U-shaped and is provided at its opposite sides with cutting edges, the said blade is not liable to accumulate trash or vegetable matter, and thus, during its operation, it automatically frees itself of material which might otherwise accumulate and interfere with its proper operation. When the blade 31 is directly below the shaft 16 neither of the ends of the spring 22 is subjected to tension; but, as the said blade 31 moves to one side or the other of a vertical plane disposed through the said shaft 16, one end or the other of the said spring 22 is wound up, and the opposite end is unwound. Thus, when the said blade begins to move in the opposite direction, the accelerated tension in the wound-up end of the said spring comes into play and promptly starts the blade upon its initial return movement, and, as the said blade passes beyond the other side of the shaft 16, that end of the spring 22 which was unwound as previously described, is wound up, while the end of the said spring which, in the first instance, was wound up, is unwound. Thus by providing a single spring and connecting the same as shown and described the cutting blade 31 is caused to start promptly in its initial reciprocatory movement.

As the disk 13 rotates the rollers 15 successively have contact with the beak portion 41 of the lever 37, and swing the said lever upon its fulcrum. When one of the rollers 15 comes in contact with the inner or rear edge of the beak portion 41 of the lever 37, the said roller will force the said beak portion up, which will carry up the forward end of the said lever 37 and swing the arm 38 toward the front end of the chopper. As the arm 38 moves forward the link 44 is drawn longitudinally, which, in turn, will pull the chopper frame 27 away from the standard 33, and the tension of the spring 34 will be augmented. When the frame 27 is moving forward it is at the end of its stroke at either side of the shaft 16, and when the parts 41, 37 and 27 are in the position as illustrated in Fig. 3 of the drawings, the said frame 27 is about to begin its stroke laterally across the row of plants. As the roller 15 which is under the pointed end of the beak portion 41 of the lever 37 passes beyond the same, the forward curved edge of the said beak portion 41, will pass down along the rear side of the said roller 15, being caused to move as stated in response to the augmented tension of the spring 34, which is exerted upon the frame 27 and has a tendency to draw the said frame toward the standard 33. By reason of the fact that the said beak portion 41 is restrained from sudden downward movement, but must work down gradually, as indicated in Fig. 4 of the drawings, the rearward movement of the frame 27 is graduated, and the said rearward movement is substantially at the same rate of speed as the forward movement of the chopper as an entirety. Thus the frame 27 and its attachments, practically cease to advance with the chopper, but remain substantially at a state of rest with relation to the advancement of the implement. While the frame 27 and its attachments are at such state of rest, the frame 27 and its attachments are swung laterally with relation to the row of standing plants, and the superfluous plants are blocked out in the manner as above described. Thus it will be seen that the blade 31 during the chopping operation will move substantially at right angles to the line of standing plants, and when the said blade 31 is not in operation it has a forward movement with the implement and in addition to which it is accelerated in its forward movement by the engagement of one of the rollers 15 with the rear edge of the beak portion 41 of the lever 37, which swings the arm 38 in a forward direction and carries the frame 27 and the blade 31 forward at a greater rate of speed than that at which the implement is traveling. Thus the forward movement lost on the part of the chopper during the chopping operation is compensated for when the said blade is not performing a chopping movement.

Having described my invention, what I claim as new, and desire to secure, by Letters Patent, is:—

1. In a cotton chopper a blade mounted for reciprocatory movement transversely of the row during the chopping operation, means for restraining the blade against forward movement during the reciprocatory movement, and automatic means for advancing the blade at a greater rate of speed than that at which the chopper is traveling, which means operates upon the blade at the end of its reciprocation.

2. A cotton chopper comprising a frame, an axle journaled for rotation thereon, traction wheels mounted upon the axle, a disk mounted upon the axle and having a continuous zig-zag groove in its periphery, a shaft journaled upon the frame and having a crank end which engages the groove of the disk, depending arms carried by said shaft, a blade frame slidably mounted upon said shaft, chopping blades carried by the said blade frame, a cross-bar mounted upon the blade frame and being located between the depending arms upon the said shaft, a lever mechanism mounted upon the chopper frame and adapted to be operated by the said disk for moving the blade frame upon the shaft in one direction, and means carried by the chopper for moving the said blade frame in the opposite direction.

3. A cotton chopper comprising a frame, a shaft journaled thereon, arms depending from said shaft, blade frames slidably mounted upon the shaft, a blade carried by the said blade frame, a bar carried by the blade frame and being located between the said depending arms, and means for sliding the said blade frame upon the said shaft.

4. A cotton chopper comprising a frame, a shaft journaled thereon, arms depending from the said shaft, a blade frame slidably mounted upon the said shaft, a blade carried by the blade frame, a cross-bar carried by the blade frame and being located between the arms carried by the said shaft, means for partially rotating the said shaft, and means for sliding the blade frame along the shaft during the rotary movement thereof.

5. A cotton chopper comprising a frame, a shaft journaled thereon, arms depending from the said shaft, a blade frame slidably mounted upon the shaft, a blade carried by the blade frame, a cross-bar carried by the blade frame and being located between the arms depending from the shaft, means for partially rotating the shaft, a spring attached at its ends to fixed points and being connected at an intermediate point to said shaft, and means for sliding the blade frame along the shaft.

6. A cotton chopper comprising a frame, a shaft journaled for partial rotation thereon, means for partly rotating the said shaft, arms depending from the said shaft, a blade frame slidably mounted upon the shaft, a blade carried by the blade frame, a cross-bar mounted upon the blade frame and being located between the arms depending from the shaft, said shaft having at its forward end a crank portion, an axle journaled to the main frame, traction wheels supporting the axle, a disk mounted upon the axle and having a zig-zag groove upon its periphery which receives the crank end portion of the said shaft, and means for sliding the blade frame along the shaft, which means is actuated by the said disk.

7. A cotton chopper comprising a frame, a shaft journaled thereon, arms depending from the said shaft, a blade frame slidably mounted upon the shaft, a blade carried by the blade frame, a cross-bar carried by the blade frame and being located between the arms depending from the shaft, a spring connected at one end with the main frame, and at its other end with the said blade frame, an axle journaled upon the main frame, traction wheels supporting said axle, a disk mounted upon the axle and having upon its periphery a zig-zag groove which receives the crank end portion of the said shaft, laterally disposed projections mounted upon the disk, a lever fulcrumed upon the main frame and having a beak extremity which engages the said laterally disposed projections upon the disk, an arm depending from said lever, and an operating means connecting the said arm with the said blade frame.

8. A cotton chopper comprising a main frame, a shaft journaled thereon, said shaft having a crank end portion, a spring attached at its ends to the main frame, and being connected at an intermediate point to the said shaft, arms depending from the said shaft, a blade frame slidably mounted upon the said shaft, a blade carried by the blade frame, a cross-bar carried by the blade frame and being located between the arms depending from the shaft, an axle journaled upon the main frame, traction wheels mounted upon the axle, a disk mounted upon the axle and having a zig-zag groove upon its periphery which receives the said crank portion of the shaft, laterally disposed projections mounted upon the disk, a lever mechanism fulcrumed upon the main frame and having a beak extremity which is adapted to engage the said laterally disposed projections upon the disk, an arm carried by the said lever, a means operatively connecting the said arm with the said blade frame, and a spring connected at one end with the said blade frame, and at its other end with the main frame.

In testimony that I claim the foregoing as my own, I have hereto affixed my signature in the presence of two witnesses.

THOMAS HENRY ELLIS.

Witnesses:
J. O. CREIGHTON,
CLANTON DAVIS.